(12) United States Patent
Hirooka et al.

(10) Patent No.: US 10,319,497 B2
(45) Date of Patent: Jun. 11, 2019

(54) MOLDED PORTION-EQUIPPED ELECTRIC CABLE AND METHOD FOR MANUFACTURING MOLDED PORTION-EQUIPPED ELECTRIC CABLE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Toshiya Hirooka, Mie (JP); Kouji Fukumoto, Mie (JP); Daisuke Hashimoto, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/743,310

(22) PCT Filed: Jun. 21, 2016

(86) PCT No.: PCT/JP2016/068321
§ 371 (c)(1),
(2) Date: Jan. 10, 2018

(87) PCT Pub. No.: WO2017/010240
PCT Pub. Date: Jan. 19, 2017

(65) Prior Publication Data
US 2018/0204652 A1     Jul. 19, 2018

(30) Foreign Application Priority Data
Jul. 10, 2015    (JP) .................................. 2015-138376

(51) Int. Cl.
*H01B 7/02* (2006.01)
*H01R 4/18* (2006.01)
(Continued)

(52) U.S. Cl.
CPC ................. *H01B 7/02* (2013.01); *H01R 4/72* (2013.01); *H01R 13/405* (2013.01);
(Continued)

(58) Field of Classification Search
None
See application file for complete search history.

(56) References Cited

U.S. PATENT DOCUMENTS 3,143,595 A * 8/1964 Martin ..................... H01R 4/72
174/84 C
3,708,611 A * 1/1973 Dinger ................ B29C 61/0616
174/84 C
(Continued)

FOREIGN PATENT DOCUMENTS

JP    2012169121 A    9/2012
JP    2015095406 A    5/2015

OTHER PUBLICATIONS

International Search Report for Application PCT/JP2016/068321 dated Sep. 20, 2016; 5 pages.

*Primary Examiner* — Dimary S Lopez Cruz
*Assistant Examiner* — Muhammed Azam
(74) *Attorney, Agent, or Firm* — Reising Ethington, P.C.

(57) ABSTRACT

A molded portion-equipped electric cable includes: a linear conductor portion; a terminal that is connected to an end portion of the conductor portion; a molded portion that covers a connecting portion between the conductor portion and the terminal such that the terminal protrudes from one end side of the molded portion and the conductor portion protrudes from the other end side of the molded portion; and
(Continued)

an insulating cover portion that covers over the molded portion and the conductor portion and is formed by shrinking a heat shrinkable tube.

6 Claims, 3 Drawing Sheets

(51) Int. Cl.
*H01R 4/72* (2006.01)
*H02G 15/04* (2006.01)
*H02G 15/18* (2006.01)
*H01R 13/405* (2006.01)

(52) U.S. Cl.
CPC ............. *H02G 15/04* (2013.01); *H01R 4/187* (2013.01); *H02G 15/1806* (2013.01)

(56) References Cited

U.S. PATENT DOCUMENTS

| | | | | |
|---|---|---|---|---|
| 3,781,762 A * | 12/1973 | Quackenbush | ...... | H01R 9/0518 439/322 |
| 4,144,404 A * | 3/1979 | De Groef | ............ | B29C 61/0616 174/88 C |
| 4,151,364 A * | 4/1979 | Ellis | ...................... | B29C 61/003 174/84 C |
| 4,431,469 A * | 2/1984 | Falcomato | .......... | B29C 61/0616 138/113 |
| 4,521,470 A * | 6/1985 | Overbergh | .......... | B29C 61/0616 156/84 |
| 4,560,219 A * | 12/1985 | Chapelot | ............ | H01R 13/5221 439/272 |
| 4,896,904 A * | 1/1990 | Gadsden | ............. | B29C 61/0616 156/86 |
| 5,440,074 A * | 8/1995 | Meltsch | .............. | B29C 61/0641 156/49 |
| 5,536,103 A * | 7/1996 | Sawada | .................. | H01R 13/42 403/326 |
| 5,562,497 A * | 10/1996 | Yagi | ..................... | H01R 13/516 439/607.47 |
| 5,844,170 A * | 12/1998 | Chor | .................... | H02G 15/068 174/74 A |
| 5,927,892 A * | 7/1999 | Teh-Tsung | ........... | H02G 3/0675 403/259 |
| 5,929,383 A * | 7/1999 | Marik | .................... | H02G 15/04 174/78 |
| 6,087,584 A * | 7/2000 | Daoud | ................. | H01R 9/0518 174/50.59 |
| 6,107,573 A * | 8/2000 | Uchiyama | ................ | H01R 4/22 174/75 R |
| 6,172,304 B1 * | 1/2001 | Laurent | ................ | H02G 15/103 174/74 A |
| 6,232,554 B1 * | 5/2001 | Yamazaki | .............. | H02G 15/04 174/653 |
| 6,359,226 B1 * | 3/2002 | Biddell | .................... | H01R 4/22 174/74 A |
| 6,419,521 B2 * | 7/2002 | Kanagawa | ......... | H01R 13/6592 439/582 |
| 6,454,598 B1 * | 9/2002 | Burwell | ................. | H01R 4/726 174/840 |
| 7,230,214 B2 * | 6/2007 | Kirby | ....................... | H01R 4/72 174/76 |
| 7,722,382 B2 * | 5/2010 | Landis | ..................... | H01R 4/26 439/393 |
| 7,834,268 B2 * | 11/2010 | Ootsuki | ................... | H01R 4/22 174/74 A |
| 8,118,614 B2 * | 2/2012 | Sawada | .............. | H01R 13/5219 439/589 |
| 8,262,408 B1 * | 9/2012 | Kelly | ................... | H01R 9/0524 439/578 |
| 9,070,988 B2 * | 6/2015 | Sato | ......................... | H01R 4/184 |
| 9,287,659 B2 * | 3/2016 | Burris | .................. | H01R 9/0524 |
| 9,356,388 B2 * | 5/2016 | Aizawa | ..................... | H01R 4/72 |
| 9,379,460 B2 * | 6/2016 | Miyamoto | ............... | H01R 4/62 |
| 9,525,220 B1 * | 12/2016 | Burris | .................... | H01R 24/40 |
| 9,666,955 B2 * | 5/2017 | Sugino | ................. | H02G 15/1806 |
| 9,780,460 B2 * | 10/2017 | Koto | ....................... | H01R 4/72 |
| 2003/0073340 A1 * | 4/2003 | Schmitt | ................ | H02G 15/007 439/460 |
| 2011/0003507 A1 * | 1/2011 | Van Swearingen | ..... | B29C 45/16 439/578 |
| 2012/0024599 A1 * | 2/2012 | Yamashita | .......... | B60R 16/0215 174/74 R |
| 2012/0077382 A1 * | 3/2012 | De Orleans E Braganca | ............ | H01R 4/56 439/620.21 |
| 2013/0126234 A1 | 5/2013 | Ono et al. | | |
| 2013/0126324 A1 * | 5/2013 | Chiang | ............... | H01H 13/7073 200/5 A |
| 2013/0210255 A1 * | 8/2013 | Uchiyama | .............. | H01R 13/52 439/271 |
| 2013/0309903 A1 * | 11/2013 | Iio | ....................... | H01R 13/5216 439/523 |
| 2014/0284099 A1 * | 9/2014 | Saito | .................... | H01B 7/2825 174/70 R |
| 2014/0295710 A1 * | 10/2014 | Inagaki | ............. | H01R 13/5216 439/660 |
| 2015/0096803 A1 * | 4/2015 | Pope | ........................ | H01R 4/72 174/84 R |
| 2016/0005511 A1 * | 1/2016 | Gravermann | .......... | H02G 15/04 174/251 |
| 2016/0052468 A1 * | 2/2016 | Kanagawa | ........... | H02G 3/0462 174/68.3 |
| 2017/0324235 A1 * | 11/2017 | Tachi | ..................... | H01B 7/282 |
| 2018/0102202 A1 * | 4/2018 | Kuroishi | ................ | B60R 16/0215 |
| 2018/0204652 A1 * | 7/2018 | Hirooka | ................ | H01R 4/72 |

* cited by examiner

MOLDED PORTION-EQUIPPED ELECTRIC CABLE AND METHOD FOR MANUFACTURING MOLDED PORTION-EQUIPPED ELECTRIC CABLE

CROSS REFERENCE TO RELATED APPLICATIONS

This application claims the priority of Japanese patent application JP2015-138376 filed on Jul. 10, 2015, the entire contents of which are incorporated herein.

TECHNICAL FIELD

The present invention relates to a molded portion-equipped electric cable including a molded portion and a terminal-equipped electric cable, and a method for manufacturing the molded portion-equipped electric cable.

BACKGROUND ART

For example, Patent Document 1 (JP2013-187041A) discloses a molded portion-equipped electric cable including a terminal-equipped electric cable in which a terminal is connected to an end portion of an insulated electric cable including a conductor and an insulating cover, and a molded portion that covers a connecting portion between the insulated electric cable and the terminal.

SUMMARY

However, in the example disclosed in Patent Document 1, when manufacturing the molded portion-equipped electric cable, it is necessary to perform a step of removing the insulating cover that is provided at an end portion of the insulated electric cable.

It is an object of the present design to provide a molded portion-equipped electric cable that includes an insulated conductor and does not require an insulating cover removing step.

A molded portion-equipped electric cable according to a first aspect includes: a linear conductor portion; a terminal that is connected to an end portion of the conductor portion; a molded portion that covers a connecting portion between the conductor portion and the terminal such that the terminal protrudes from one end side of the molded portion and the conductor portion protrudes from another end side of the molded portion; and an insulating cover portion that covers over the molded portion and the conductor portion and is formed by shrinking a heat shrinkable tube, and a first stepped portion is formed on an outer circumferential surface of the molded portion such that the first stepped portion extends along a circumferential direction of the molded portion and a portion of the first stepped portion that is on the other end side protrudes so as to be present on the outer circumferential surface side relative to a portion of the first stepped portion that is on the one end side, and an end portion of the cover portion is hooked onto the first stepped portion.

A molded portion-equipped electric cable according to a second aspect is an aspect of the molded portion-equipped electric cable according to the first aspect. In the molded portion-equipped electric cable according to the second aspect, a recess portion is formed on the molded portion, the recess portion being formed so as to extend along the circumferential direction of the molded portion and be inwardly recessed from the outer circumferential surface of the molded portion, and a portion of the recess portion that is on the other end side constitutes the first stepped portion.

A molded portion-equipped electric cable according to a third aspect is an aspect of the molded portion-equipped electric cable according to the first or second aspect. The molded portion-equipped electric cable according to the third aspect further includes an adhesive portion that is provided between the molded portion and the cover portion and fills a gap between the cover portion and the molded portion.

A molded portion-equipped electric cable according to a fourth aspect is an aspect of the molded portion-equipped electric cable according to the third aspect. In the molded portion-equipped electric cable according to the fourth aspect, a second stepped portion is formed on the molded portion, the second stepped portion being positioned on the other end side relative to the first stepped portion onto which the cover portion is hooked, and the adhesive portion is provided in the second stepped portion.

A molded portion-equipped electric cable according to a fifth aspect is an aspect of the molded portion-equipped electric cable according to any one of the first to fourth aspects. In the molded portion-equipped electric cable according to the fifth aspect, a gap is formed between the conductor portion and the cover portion.

A method for manufacturing a molded portion-equipped electric cable according to a sixth aspect includes the steps of: connecting a terminal to an end portion of a linear conductor portion; molding a molded portion that covers a connecting portion between the conductor portion and the terminal such that the terminal protrudes from one end side of the molded portion and the conductor portion protrudes from another end side of the molded portion, and has a first stepped portion that is formed such that the first stepped portion extends along an outer circumferential surface of the molded portion in a circumferential direction of the molded portion and a portion of the first stepped portion that is on the other end side protrudes so as to be present on the outer circumferential surface side with relative to a portion of the first stepped portion that is on the one end side; shrinking a heat shrinkable tube such that an end portion of the shrunk heat shrinkable tube is hooked onto the first stepped portion so as to form a cover portion that covers over the molded portion and the conductor portion; and providing an adhesive portion that fills a gap between the cover portion and the molded portion.

According to each aspect described above, a cover portion that covers over a molded portion and a conductor portion is formed by heating a heat shrinkable tube, with the molded portion and the conductor portion passing through the heat shrinkable tube. In this case, the conductor portion is insulated by the cover portion. Here, an end portion of the cover portion is hooked onto a first stepped portion. For this reason, the conductor portion can be more reliably insulated by the cover portion. From the above, in each aspect described above, in the molded portion-equipped electric cable including the insulated conductor portion, it is possible to eliminate the need for an insulating cover removing step.

Also, according to the second aspect, a recess portion that is inwardly recessed from an outer circumferential surface side of the molding portion is formed on the molded portion, and a portion of the recess portion that is on the other end side of the molded portion constitutes a first stepped portion. In this case, it is possible to suppress a situation in which the molded portion has a large outer shape.

Also, according to the third aspect, it is possible to more reliably provide a water seal between the molded portion and the cover portion by providing an adhesive portion.

Also, according to the fourth aspect, as a result of the heat shrinkable tube being shrunk, a second stepped portion restrains the adhesive portion from moving toward the other end of the molded portion. For this reason, it is possible to more reliably provide a water seal between the molded portion and the cover portion.

Also, according to the fifth aspect, a gap is formed between the conductor portion and the cover portion, and thus the conductor portion can be easily bent.

Also, according to the sixth aspect, an end portion of the cover portion is hooked onto a first stepped portion, and thus the conductor portion can be more reliably insulated by the cover portion. From the above, in the method for manufacturing a molded portion-equipped electric cable, it is possible to eliminate the need for an insulating cover removing step.

DESCRIPTION OF EMBODIMENTS

Hereinafter, an embodiment will be described with reference to the accompanying drawings. The embodiment given below is an example in which the present design is embodied, and thus is not intended to limit the technical scope of the present invention.

Embodiment

First, a molded portion-equipped electric cable 100 according to an embodiment will be described with reference to FIGS. 1 to 3. In the present embodiment, the molded portion-equipped electric cable 100 includes a conductor portion 1, a terminal 2, a molded portion 3, a cover portion 4, and an adhesive portion 5. In the molded portion 3, a first stepped portion 311 is formed, onto which an end portion of the cover portion 4 is hooked. The molded portion-equipped electric cable 100 is included in, for example, a wire harness mounted on a vehicle such as an automobile.

Figure 1:
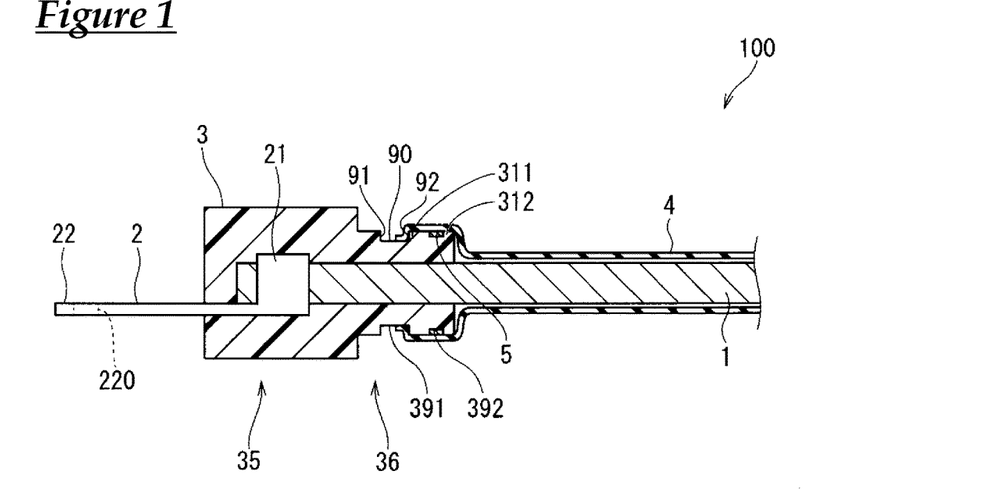
FIG. 1 is a partial cross-sectional view of a molded portion-equipped electric cable according to an embodiment.

FIG. 1 is a partial cross-sectional view of the molded portion-equipped electric cable 100. FIG. 2 is a cross-sectional view of the molded portion-equipped electric cable 100, and is an enlarged view of a portion of FIG. 1 (the vicinity of the end portion of the cover portion 4 and the first stepped portion 311). FIG. 3 is a diagram illustrating a method for manufacturing the molded portion-equipped electric cable 100.

The conductor portion 1 of the molded portion-equipped electric cable 100 will be described first. The conductor portion 1 is a linear metal member. For example, the conductor portion 1 is a linear member composed mainly of a metal such as copper or aluminum.

Also, in the present embodiment, the conductor portion 1 is a flexible member that is bendable. The conductor portion 1 may be, for example, a stranded cable in which a plurality of strands are twisted together, or a braided cable in which a plurality of strands are braided. The conductor portion 1 may be a single-core wire or the like, or may be a member that keeps a linear shape.

The conductor portion 1 is bare when a molded portion-equipped electric cable 100 is manufactured. Here, a terminal 2, which will be described later, is connected to an end portion of the bare conductor portion 1, and thereafter the conductor portion 1 is covered by a cover portion 4, which will be described later. A detailed description thereof will be given later.

A description of the terminal 2 will be given next. The terminal 2 is connected to an end portion of the conductor portion 1. Accordingly, the conductor portion 1 and the terminal 2 are electrically connected. The terminal 2 is a member composed mainly of, for example, a metal such as copper.

In the present embodiment, as shown in FIG. 1, the terminal 2 includes a first connecting portion 21 that is connected to the end portion of the conductor portion 1 and a second connecting portion 22 that can be connected to a mating member that is a connection partner of the terminal 2.

Here, the first connecting portion 21 includes a crimping piece that can be crimped to the end portion of the conductor portion 1. In the molded portion-equipped electric cable 100, the crimping piece of the first connecting portion 21 is provided so as to cover the end portion of the conductor portion 1 in a clamped state. The first connecting portion 21 may be connected to the conductor portion 1 through welding such as heat welding or ultrasonic welding. In this case, the first connecting portion 21 may be formed in, for example, a flat plate shape so that the end portion of the conductor portion 1 can be welded.

Also, here, in the second connecting portion 22, a fastening hole 220 is formed that allows the second connecting portion 22 to be fastened to the mating member with a bolt. The mating member that is the connection partner of the terminal 2 may be, for example, a terminal block, or the like.

A description of the molded portion 3 will be given next. The molded portion 3 covers a connecting portion between the conductor portion 1 and the terminal 2 such that the terminal 2 protrudes from one end side of the molded portion 3 and the conductor portion 1 protrudes from the other end side of the molded portion 3. More specifically, the molded portion 3 covers the end portion of the conductor portion 1 and the first connecting portion 21 of the terminal 2. Here, one end side of the molded portion 3 may also be referred to as the leading end side of the molded portion 3. Likewise, the other end side of the molded portion 3 may also be referred to as the trailing end side of the molded portion 3.

The molded portion 3 is, for example, insert molded so as to cover the connecting portion between the conductor portion 1 and the terminal 2 that are inserts. Examples of resin that can be used to form the molded portion 3 include PBT (polybutylene terephthalate) resin, PPS (poly(phenylene sulfide)) resin, PPA (polyphthalamide) resin, LCP resin (liquid crystal polymer), phenol-based resin, polyester-based resin, polyamide-based resin, and epoxy-based resin.

In the molded portion-equipped electric cable 100, the terminal 2 protrudes from one end side of the molded portion 3. More specifically, the second connecting portion 22 of the terminal 2 protrudes from one end side of the molded portion 3. On the other hand, the conductor portion 1 protrudes from the other end side of the molded portion 3. More specifically, a portion of the conductor portion 1 excluding the end portion of the conductor portion 1 protrudes from the other end side of the molded portion 3.

Here, as shown in FIG. 1, the molded portion 3 includes: a first portion 35 that constitutes one end side portion that covers the connecting portion between the conductor portion 1 and the terminal 2, and a second portion 36 that protrudes from the first portion 35 toward the conductor portion 1 side and constitutes the other end side portion. As shown in FIG. 1, the second portion 36 is also a portion that covers over only the conductor portion 1.

Then, as shown in FIG. 1, a first stepped portion 311 extending along a circumferential direction of the molded portion 3 is formed on an outer circumferential surface of the molded portion 3. The first stepped portion 311 is formed such that a portion of the first stepped portion 311 that is on the other end side protrudes so as to be present on the outer circumferential surface side of the molded portion 3 relative to a portion of the first stepped portion 311 that is on the one end side of the molded portion 3. In the present embodiment, the first stepped portion 311 is formed on the second portion 36 of the molded portion 3.

Also, in the present embodiment, furthermore, a second stepped portion 312 is formed on the molded portion 3. The second stepped portion 312 is formed on the other end side of the molded portion 3 relative to the first stepped portion 311. Here, as shown in FIG. 1, the first stepped portion 311 and the second stepped portion 312 are both formed on the second portion 36 of the molded portion 3.

Figure 2:
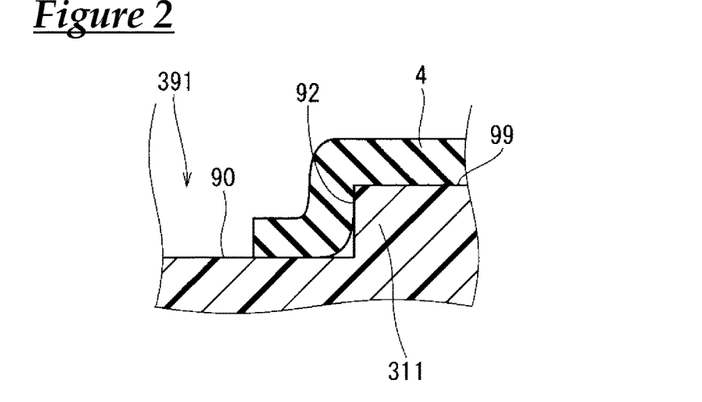
FIG. 2 is an enlarged cross-sectional view of a portion of the molded portion-equipped electric cable according to the embodiment.

In the present embodiment, as shown in FIG. 2, an end portion of the cover portion 4, which will be described later, is hooked onto the first stepped portion 311. The first stepped portion 311 preferably includes a surface orthogonal to the direction of extension of the molded portion 3. This allows the end portion of the cover portion 4 to easily hook onto the first stepped portion 311. Also, the second stepped portion 312 restrains the adhesive portion 5, which will be described later, from moving toward the other end of the molded portion 3. Also, here, the direction of extension of the molded portion 3 matches the direction of extension of the conductor portion 1.

Also, in the present embodiment, on the molded portion 3, a recess portion (hereinafter referred to as first recess portion 391) is formed that is formed along the circumferential direction of the molded portion 3 and inwardly recessed from the outer circumferential surface of the molded portion 3. A portion of the first recess portion 391 that is on the other end side of the molded portion 3 constitutes the first stepped portion 311. In addition to the first recess portion 391, another recess portion (hereinafter referred to as second recess portion 392) is formed on the molded portion 3. The second recess portion 392 is formed on the other end side of the molded portion 3 relative to the first recess portion 391. Here, a portion of the second recess portion 392 that is on the other end side of the molded portion 3 constitutes the second stepped portion 312.

First, the first recess portion 391 and the first stepped portion 311 will be described with reference to FIGS. 1 and 2. The first recess portion 391 is formed on one end side of the molded portion 3 relative to the second recess portion 392. Here, as shown in FIG. 1, the first recess portion 391 is inwardly recessed deeper than the second recess portion 392.

As shown in FIGS. 1 and 2, in the present embodiment, the first recess portion 391 includes a bottom surface 90 that constitutes the bottom of the first recess portion 391 and extends along the circumferential direction of the molded portion 3, a first wall surface 91 that is connected to the bottom surface 90 on one end side of the molded portion 3, and a second wall surface 92 that is connected to the bottom surface 90 on the other end side of the molded portion 3. Here, the bottom surface 90 is formed so as to extend along the direction of extension of the molded portion 3. The first wall surface 91 and the second wall surface 92 are formed so as to be orthogonal to the bottom surface 90. That is, here, the second wall surface 92 is orthogonal to the direction of extension of the molded portion 3. The first stepped portion 311 is a portion of the first recess portion 391 that is on the other end side of the molded portion 3. That is, a portion of the first recess portion 391 including the second wall surface 92 constitutes the first stepped portion 311.

As another example of the first recess portion 391, the angle between the bottom surface 90 and the first wall surface 91 and the angle between the bottom surface 90 and the second wall surface 92 may be an angle other than 90 degrees. That is, the first wall surface 91 and the second wall surface 92 may be formed oblique to the bottom surface 90. Also, as another aspect, the first recess portion 391 may include a recessed curved surface. In this case, for example, the first wall surface 91 and the second wall surface 92 may be connected to the bottom surface 90 via the curved surface. Also, the first wall surface 91 and the second wall surface 92 may be connected without the bottom surface 90, or in other words, the first recess portion 391 may be a V-shaped recess portion that extends along the circumferential direction of the molded portion 3.

Also, here, as with the first recess portion 391, the second recess portion 392 also includes a bottom surface that constitutes the bottom of the second recess portion 392 and extends along the circumferential direction of the molded portion 3, a first wall surface that is connected to the bottom surface on one end side of the molded portion 3, and a second wall surface that is connected to the bottom surface on the other end side of the molded portion 3. Then, a portion of the second recess portion 392 including the second wall surface constitutes the second stepped portion 312.

Operational effects produced by the first stepped portion 311 and the second stepped portion 312 will be described later.

A description of the cover portion 4 and the adhesive portion 5 will be given next. In the molded portion-equipped electric cable 100, the cover portion 4 covers over the molded portion 3 and the conductor portion 1. More specifically, here, the cover portion 4 covers over the other end side of the molded portion 3 (the second portion 36) and the conductor portion 1 extending from the second portion 36.

The cover portion 4 is an insulating member formed by shrinking a heat shrinkable tube 40. The heat shrinkable tube 40 is, for example, a tubular member made of a synthetic resin such as a polyolefin-based synthetic resin, a nylon-based synthetic resin, a silicone-based synthetic resin, a fluorine resin-based synthetic resin, or a polyester elastomer-based synthetic resin. The heat shrinkable tube 40 is obtained by heating and drawing a super thin tubular resin member molded through extrusion molding into a thick tubular shape, which is then cooled. The heat shrinkable tube 40 obtained in the manner described above has the shape memory property of shrinking to its original thin tubular shape, which is its shape prior to being drawn out, when heated.

In the molded portion-equipped electric cable 100, the adhesive portion 5 is provided between the cover portion 4 and the molded portion 3 and fills a gap between the cover portion 4 and the molded portion 3. With this configuration, it is possible to suppress a situation in which a liquid such as water runs along the outer circumferential surface of the molded portion 3 and enters a portion of the cover portion 4 that is on the conductor portion 1 side.

Also, in the present embodiment, the adhesive portion 5 is provided between the molded portion 3 and the cover portion 4. More specifically, the adhesive portion 5 is provided in the second recess portion 392 of the molded portion 3. For example, the adhesive portion 5 is provided in the second recess portion 392 of the molded portion 3 by being applied along the second recess portion 392. As another example, a solid or semi-solid tubular adhesive portion 5 may be provided in the second recess portion 392. For the adhesive portion 5, for example, an adhesive such as a polyamide-based adhesive, a modified olefin-based adhesive, or a polyester-based adhesive may be used.

In the present embodiment, the adhesive portion 5 is provided in the second recess portion 392 of the molded portion 3 before the heat shrinkable tube 40 is heated. Then, when the heat shrinkable tube 40 is heated, with the adhesive portion 5 being provided in the second recess portion 392, the heat shrinkable tube 40 is shrunk, and eventually an inner circumferential surface of the heat shrinkable tube 40 is adhered to the adhesive portion 5. As a result, the adhesive portion 5 is interposed between the cover portion 4 and the molded portion 3, the cover portion 4 being a member formed by shrinking the heat shrinkable tube 40. Accordingly, it is possible to provide a water seal in the molded portion-equipped electric cable 100.

Also, as shown in FIG. 1, in the present embodiment, the adhesive portion 5 is not provided between the cover portion 4 and the conductor portion 1. That is, the adhesive portion 5 is provided only between the molded portion 3 and the cover portion 4. With this configuration, in the molded portion-equipped electric cable 100, the cover portion 4 covers the conductor portion 1 so as to be capable of moving relative to the conductor portion 1 in the direction of extension of the conductor portion 1. In this case, it is possible to suppress a situation in which the flexibility of the conductor portion 1 is impaired by the adhesive portion 5.

Also, here, a gap is formed between the cover portion 4 and the conductor portion 1. That is, the cover portion 4 is not in close contact with the conductor portion 1. For this reason, the flexibility of the conductor portion 1 is not impaired. Also, in this case, the gap between the cover portion 4 and the conductor portion 1 may be formed so as to extend, for example, along the entire portion between molded portions 3 that are provided on opposite sides of the conductor portion 1.

In order to attain a state as described above, here, for example, a heat shrinkable tube 40 that has, in its most shrunk state, an inner diameter larger than the outer diameter of the conductor portion 1 may be used as the cover portion 4. As another example, the gap between the cover portion 4 and the conductor portion 1 may be formed by adjusting the heating time and temperature at which the heat shrinkable tube 40 is heated.

Figure 3:
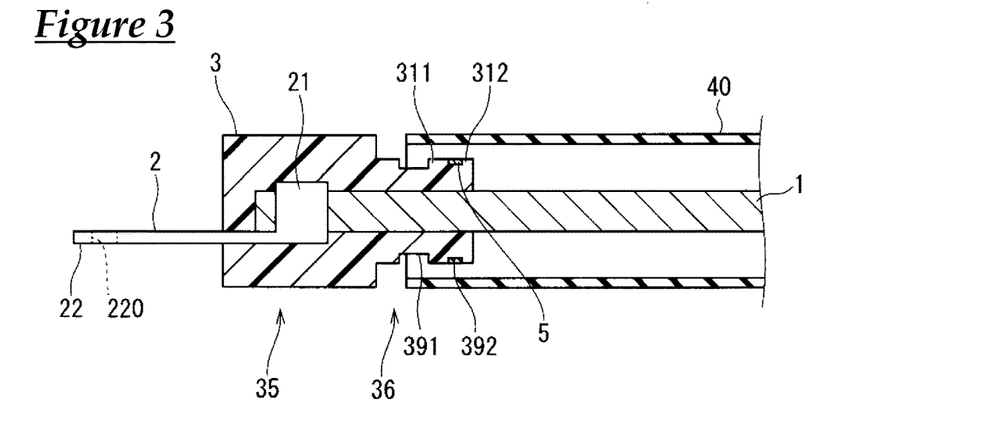
FIG. 3 is a diagram illustrating a method for manufacturing the molded portion-equipped electric cable according to the embodiment.

Next is a description of a method for manufacturing a molded portion-equipped electric cable 100 and operational effects of the first stepped portion 311 and the second stepped portion 312 of the molded portion 3, with reference to FIGS. 1 to 3. The method for manufacturing a molded portion-equipped electric cable includes a connecting step, a molding step, a cover portion forming step, and an adhesive portion providing step.

The connecting step is a step of connecting a terminal 2 to an end portion of a linear conductor portion 1. Here, crimping work to crimp a first connecting portion 21 of the terminal 2 to the end portion of the conductor portion 1 is performed.

In the present embodiment, next, the molding step is performed. The molding step is a step of molding a molded portion 3 that covers a connecting portion between the conductor portion 1 and the terminal 2 such that the terminal 2 protrudes from one end side of the molded portion 3 and the conductor portion 1 protrudes from the other end side of the molded portion 3, and has a first stepped portion 311 that is formed such that the first stepped portion 311 extends along the outer circumferential surface of the molded portion 3 in a circumferential direction of the molded portion 3 and a portion of the first stepped portion 311 that is on the other end side of the molded portion 3 protrudes so as to be present on the outer circumferential surface side of the molded portion 3 relative to a portion of the first stepped portion 311 that is on one end side of the molded portion 3. Here, resin is injected into a predetermined mold die with the connecting portion between the terminal 2 and the conductor portion 1 set in place. Then, as a result of the resin in the mold die hardening, a molded portion 3 that covers the connecting portion between the terminal 2 and the conductor portion 1 is molded.

In the present embodiment, next, the adhesive portion providing step is performed. The adhesive portion providing step is a step of providing an adhesive portion 5 that fills a gap between the cover portion 4 and the molded portion 3. Here, as shown in FIG. 3, the adhesive portion 5 is provided in a second recess portion 392 of the molded portion 3. For example, the adhesive portion 5 may be provided so as to protrude from the second recess portion 392 toward the outer circumferential surface side, or in other words, may be provided so as to rise toward the outer circumferential surface side. In this case, the cover portion 4 and the adhesive portion 5 are more reliably adhered to each other.

In the present embodiment, next, the cover portion forming step is performed. The cover portion forming step is a step of shrinking a heat shrinkable tube 40 such that an end portion of the shrunk heat shrinkable tube 40 is hooked onto the first stepped portion 311 so as to form a cover portion 4 that covers over the molded portion 3 and the conductor portion 1. Here, as shown in FIG. 3, a portion of the molded portion 3 that is on the other end side of the molded portion 3 and the conductor portion 1 are allowed to pass through the heat shrinkable tube 40, with the adhesive portion 5 being provided in the second recess portion 392. At this time, the portion of the molded portion 3 that is on the other end side of the molded portion 3 and the conductor portion 1 are allowed to pass through the heat shrinkable tube 40 such that an end portion of the heat shrinkable tube 40 that is on the molded portion 3 side is positioned to overlap a first recess portion 391 of the molded portion 3.

More specifically, the molded portion 3 and the conductor portion 1 are allowed to pass through the heat shrinkable tube 40 such that the end portion of the heat shrinkable tube 40 that is on the molded portion 3 side is positioned on the one end side of the molded portion 3 relative to a second wall surface 92 of the first recess portion 391 of the molded portion 3. Then, in this state, the heat shrinkable tube 40 is heated. The heated heat shrinkable tube 40 shrinks and comes into close contact with the outer circumferential surface of the molded portion 3.

Here, the heated heat shrinkable tube 40 shrinks in a radial direction of the heat shrinkable tube 40 and also shrinks in the direction of extension of the heat shrinkable tube 40. At this time, if the heat shrinkable tube 40 shrinks excessively in the direction of extension of the heat shrinkable tube 40, a problem may arise such as a portion that needs to be covered being partially exposed.

However, in the present embodiment, the heat shrinkable tube 40 is heated, with the end portion of the heat shrinkable tube 40 that is on the molded portion 3 side being positioned to overlap the first recess portion 391. Accordingly, the above-described problem can be suppressed. That is, as a result of the heat shrinkable tube 40 being shrunk in the radial direction, as shown in FIG. 2, the heat shrinkable tube 40 comes into contact with a protruding surface 99 that is connected to the second wall surface 92 on the other end side and a bottom surface 90 of the first recess portion 391. Here, when the heat shrinkable tube 40 is shrunk in the direction of extension of the heat shrinkable tube 40, a portion of the heat shrinkable tube 40 comes into contact with the second wall surface 92 and is caught thereon. This configuration restrains the end portion of the heat shrinkable tube 40 that is on the molded portion 3 side from moving beyond the first stepped portion 311 including the second wall surface 92 and toward the other end side of the molded portion 3. In the operation of heating the heat shrinkable tube 40, it is preferable to first heat the end portion of the heat shrinkable tube 40 and thereafter heat an intermediate region of the heat shrinkable tube 40. In this case, it is possible to more reliably cause the end portion of the heat shrinkable tube 40 to hook onto the first stepped portion 311 of the molded portion 3.

Also, here, when the adhesive portion 5 moves toward the other end side of the molded portion 3 while the heat shrinkable tube 40 is shrunk, the adhesive portion 5 comes into contact with the second stepped portion 312 including the second wall surface of the second recess portion 392. This configuration suppresses a situation in which the adhesive portion 5 moves toward the other end side of the molded portion 3. That is, the second stepped portion 312 serves as a positioning guide for the adhesive portion 5. As a result, it is possible to more reliably provide a water seal between the molded portion 3 and the cover portion 4 at the second stepped portion 312 of the second recess portion 392.

Upon completion of the operation of shrinking the heat shrinkable tube 40, with the end portion of the heat shrinkable tube 40 being hooked onto the first stepped portion 311 of the molded portion 3, a cover portion 4 that covers over the molded portion 3 and the conductor portion 1 is formed, and a molded portion-equipped electric cable 100 can be obtained. From the above, in the present embodiment, the expression "the end portion of the cover portion 4 is hooked onto the first stepped portion 311 in the molded portion-equipped electric cable 100" refers to a state in which the end portion of the cover portion 4 includes at least a portion that is in close contact with the second wall surface 92 of the first recess portion 391. Preferably, the end portion of the cover portion 4 is in close contact with the outer circumferential surface of the molded portion 3 via the first stepped portion 311, and in this example, is in close contact with the bottom surface 90 of the first recess portion 391 and the protruding surface 99. In this case, the end portion of the cover portion 4 is more reliably hooked onto the first stepped portion 311.

Advantageous Effects

In the present embodiment, the cover portion 4 that covers over the molded portion 3 and the conductor portion 1 is formed by heating a heat shrinkable tube 40 with the molded portion 3 and the conductor portion 1 passing through the heat shrinkable tube 40. In this case, the conductor portion 1 is insulated by the cover portion 4. Here, the end portion of the cover portion 4 is hooked onto the first stepped portion 311. Accordingly, it is possible to suppress a situation in which the heat shrinkable tube 40 is shrunk excessively in the direction of extension of the heat shrinkable tube 40, and the conductor portion 1 can be more reliably insulated by the cover portion 4. From the above, according to the present embodiment, it is possible to eliminate the need for an insulating cover removing step by employing the molded portion-equipped electric cable 100 including the insulated conductor portion 1.

Also, in the present embodiment, the first recess portion 391 that is inwardly recessed from the outer circumferential surface of the molded portion 3 is formed on the molded portion 3, and a portion of the first recess portion 391 that is on the other end side of the molded portion 3 constitutes the first stepped portion 311. In this case, it is possible to suppress a situation in which the molded portion 3 has a large outer shape.

Also, in the present embodiment, by providing the adhesive portion 5, it is possible to more reliably provide a water seal between the molded portion 3 and the cover portion 4. Also, here, the adhesive portion 5 is provided only between the molded portion 3 and the cover portion 4, and thus the flexibility of the conductor portion 1 is improved as compared to a configuration in which the cover portion 4 and the conductor portion 1 are adhered to each other by the adhesive portion 5. Also, in this case, the amount of adhesive portion 5 required to provide a water seal in the molded portion-equipped electric cable 100 can be reduced.

Also, in the present embodiment, the second stepped portion 312 including the second wall surface of the second recess portion 392 restrains the adhesive portion 5 from moving toward the other end side of the molded portion 3 while the heat shrinkable tube 40 is shrunk. For this reason, it is possible to more reliably provide a water seal between the molded portion 3 and the cover portion 4.

Also, in the present embodiment, a gap is formed between the conductor portion 1 and the cover portion 4, and thus the conductor portion 1 can be easily bent.

First Variation

Figure 4:
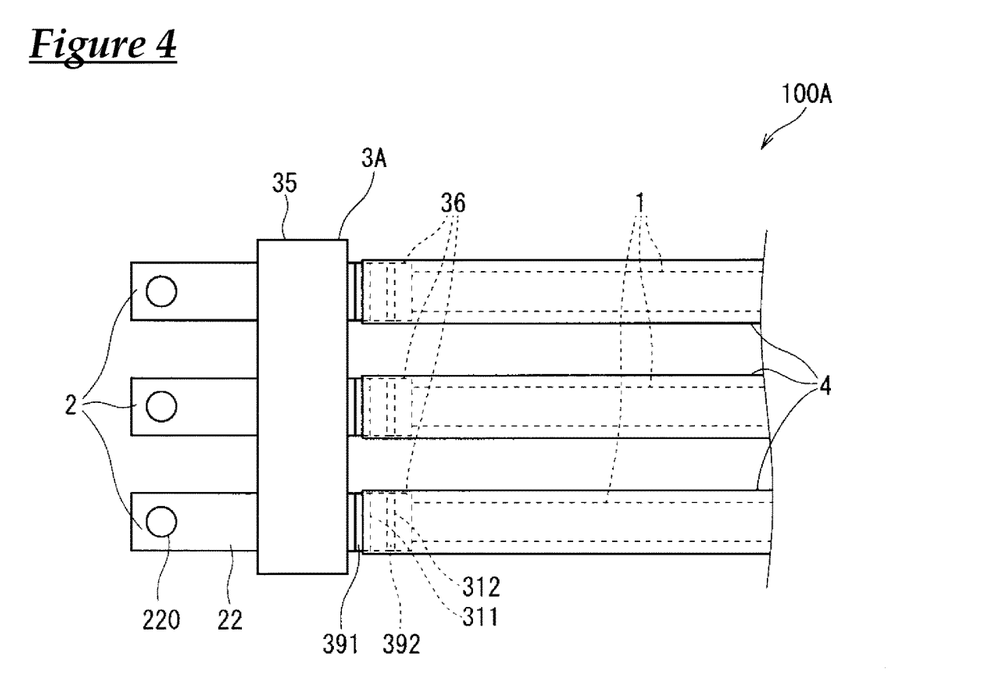
FIG. 4 is a plan view of a molded portion-equipped electric cable according to a first variation.

A molded portion-equipped electric cable 100A according to a first variation will be described next with reference to FIG. 4. FIG. 4 is a plan view of the molded portion-equipped electric cable 100A. In FIG. 4, constituent elements that are the same as those shown in FIGS. 1 to 3 are given the same reference numerals.

As shown in FIG. 4, the molded portion-equipped electric cable 100A according to this example includes a plurality of (three here) conductor portions 1 and a plurality of (three here) terminals 2. Then, connection portions between the three conductor portions 1 and the three terminals 2 are covered with one molded portion 3A.

The molded portion 3A according to this example is different from that of the embodiment described above in that the molded portion 3A includes one first portion 35 and three second portions 36. The three second portions 36 are formed so as to protrude from the single first portion 35 and respectively cover the three conductor portions 1. Also, in each of the three second portions 36, a first stepped portion 311 and a first recess portion 391, as well as a second stepped portion 312 and a second recess portion 392 are formed.

Also, the molded portion-equipped electric cable 100A includes three cover portions 4. As shown in FIG. 4, the three cover portions 4 respectively cover the three second portions 36 and the conductor portions 1 extending from the second portions 36.

In this example as well, in the molded portion-equipped electric cable 100A including the insulated conductor portion 1, it is possible to eliminate the need for an insulating cover removing step.

Also, in this example, the three second portions 36 are disposed side by side and protrude from the single first portion 35. In each of the second portions 36, a first recess portion 391 that is inwardly recessed from the outer circumferential surface is formed, and a portion of the first recess portion 391 that is on the other end side constitutes a stepped portion 311. In this case, it is possible to suppress the outer diameter of the second portion 36 from increasing, and it is also possible to reduce the distance between adjacent second portions 36.

Second Variation

Figure 5:
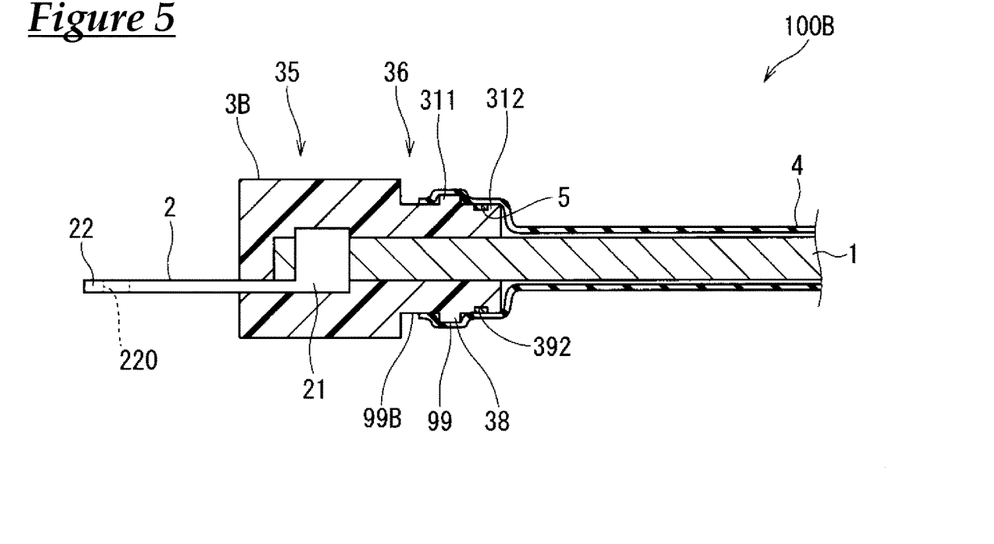
FIG. 5 is a partial cross-sectional view of a molded portion-equipped electric cable according to a second variation.

A molded portion-equipped electric cable 100B according to a second variation will be described next with reference to FIG. 5. FIG. 5 is a partial cross-sectional view of the molded portion-equipped electric cable 100B. In FIG. 5, constituent elements that are the same as those shown in FIGS. 1 to 4 are given the same reference numerals.

As shown in FIG. 5, in the molded portion-equipped electric cable 100B according to this example, a projection portion 38 that protrudes from an inner side toward the outer circumferential surface side is formed on an outer circumferential surface of the molded portion 3B. The projection portion 38 is formed so as to extend along the circumferential direction of the molded portion 3B. In this example, a portion of the projection portion 38 that is on one end side of the molded portion 3B constitutes a first stepped portion 311.

As shown in FIG. 5, in this example, a cover portion 4 is in close contact with a tip end surface (protruding surface 99) of the projection portion 38 and an outer circumferential surface 99B that is present on one end side of the molded portion 3B relative to the projection portion 38 in the second portion 36. The cover portion 4 is formed by shrinking a heat shrinkable tube 40 with its end portion being hooked onto the first stepped portion 311 that is a portion of the projection portion 38 that is on one end side of the molded portion 3B. From the above, in this example as well, it is possible to suppress a situation in which the heat shrinkable tube 40 is shrunk excessively in the direction of extension of the heat shrinkable tube 40. Also, in the molded portion-equipped electric cable 100B including the insulated conductor portion 1, it is possible to eliminate the need for an insulating cover removing step.

Third Variation

Figure 6:
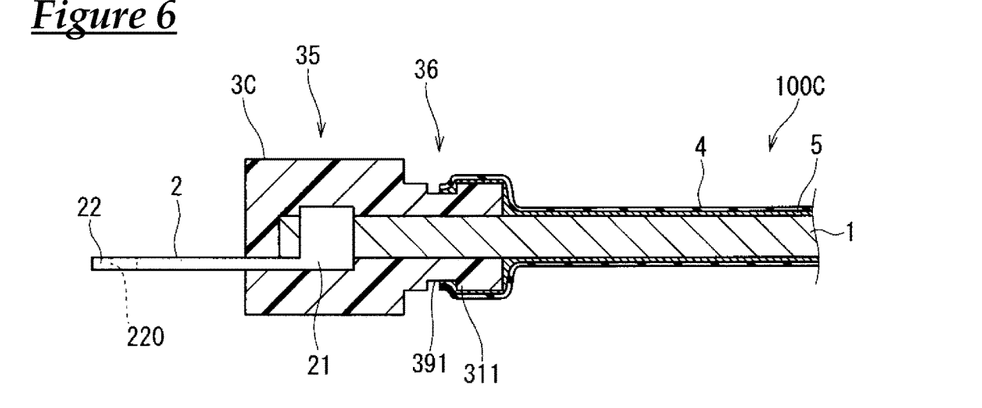
FIG. 6 is a partial cross-sectional view of a molded portion-equipped electric cable according to a third variation.
Figure 7:
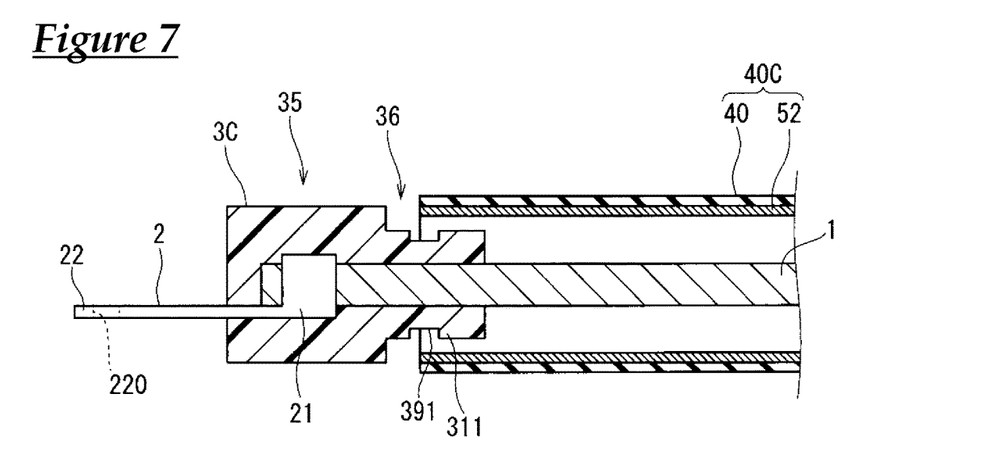
FIG. 7 is a diagram illustrating a method for manufacturing the molded portion-equipped electric cable according to the third variation.

A molded portion-equipped electric cable 100C according to a third variation will be described next with reference to FIGS. 6 and 7. FIG. 6 is a partial cross-sectional view of the molded portion-equipped electric cable 100C. FIG. 7 is a diagram illustrating a method for manufacturing the molded portion-equipped electric cable 100C. In FIGS. 6 and 7, constituent elements that are the same as those shown in FIGS. 1 to 5 are given the same reference numerals.

As shown in FIG. 6, in the molded portion-equipped electric cable 100C according to this example, an adhesive portion 5 is also provided between the cover portion 4 and the conductor portion 1. That is, the adhesive portion 5 is provided on the inner side of the cover portion 4 so as to extend along the entire length of the cover portion 4.

Also, in the molded portion-equipped electric cable 100C according to this example, because a structure in which the adhesive portion 5 is also provided between the cover portion 4 and the conductor portion 1 is used, a molded portion 3C is different from that of the embodiment described above in that the second recess portion 392 is omitted. That is, the second stepped portion 312 that serves as a positioning guide for the adhesive portion 5 is omitted.

In this example, as shown in FIG. 7, for example, the cover portion 4 and the adhesive portion 5 are formed by shrinking a heat shrinkable tube 40 that is internally provided with a layer of adhesive 52. More specifically, the cover portion 4 and the adhesive portion 5 are formed by heating and shrinking a water seal tube 40C, the water seal tube 40C having a double layer structure including a heat shrinkable tube 40 and a layer of thermoplastic adhesive 52 that is formed on the inner side surface of the heat shrinkable tube 40. The adhesive 52 provided on the inner side of the heat shrinkable tube 40 may be, for example, a polyamide-based, modified olefin-based, or polyester-based hot melt adhesive. In this case, in a method for manufacturing the molded portion-equipped electric cable 100C according to this example, a cover portion forming step and an adhesive portion providing step may be performed simultaneously.

In this example, the water seal tube 40C is heated, with the second portion 36 of the molded portion 3 and the conductor portion 1 that extends from the second portion 36 passing through the water seal tube 40C. The water seal tube 40C is heated at a temperature at which the water seal tube 40C shrinks and the adhesive 52 formed on the inner side of the water seal tube 40C melts.

The cover portion 4 and the adhesive portion 5 are formed by heating and shrinking the water seal tube 40C. In this case, the cover portion 4 comes into close contact with the conductor portion 1 and the molded portion 3 via the adhesive portion 5. For this reason, the water sealability of the molded portion-equipped electric cable 100C can be further improved.

Also, in this example as well, the cover portion 4 is formed by shrinking the water seal tube 40C with its end portion being hooked onto a stepped portion 311 of a first recess portion 391. From the above, in this example as well, it is possible to suppress a situation in which the water seal tube 40C is shrunk excessively in the direction of extension of the water seal tube 40C. Also, in the molded portion-equipped electric cable 100C including the insulated conductor portion 1, it is possible to eliminate the need for an insulating cover removing step.

Fourth Variation

Figure 8:
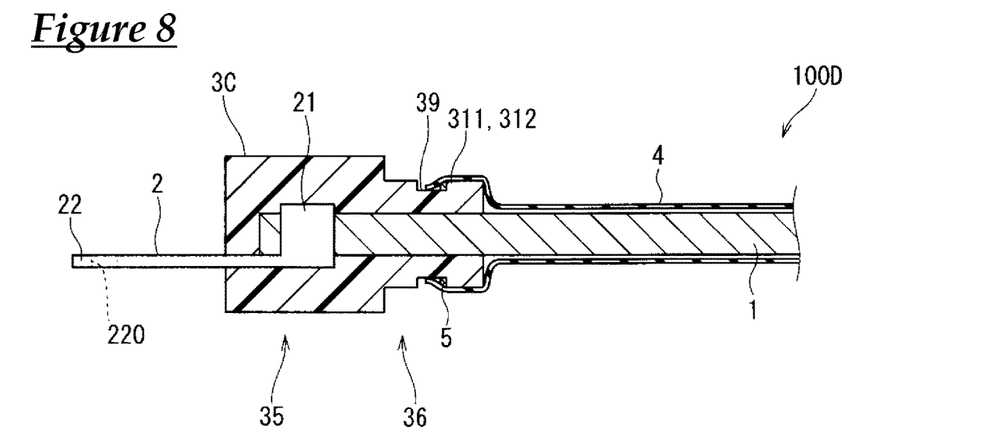
FIG. 8 is a partial cross-sectional view of a molded portion-equipped electric cable according to a fourth variation.

A molded portion-equipped electric cable 100D according to a fourth variation will be described next with reference to FIG. 8. FIG. 8 is a partial cross-sectional view of the molded portion-equipped electric cable 100D. In FIG. 8, constituent elements that are the same as those shown in FIGS. 1 to 7 are given the same reference numerals.

As shown in FIG. 8, in the molded portion-equipped electric cable 100D according to this example, a gap is formed between the conductor portion 1 and the cover portion 4. However, unlike the embodiment described above, one recess portion 39 is formed in the molded portion 3C. That is, the molded portion according to this example has the same structure as that of the molded portion 3C according to the third variation. A portion of the recess portion 39 that is on the other end side of the molded portion 3C functions as a first stepped portion 311 and a second stepped portion 312.

That is, in this example, an adhesive portion 5 is provided in the single recess portion 39, and a heat shrinkable tube 40 is heated with its end portion that is on the molded portion 3C side being positioned to overlap the recess portion 39 in which the adhesive portion 5 is provided. Then, the heat shrinkable tube 40 is shrunk with its end portion that is on the molded portion 3C side being hooked onto a portion of the recess portion 39 that is on the other end side, and the portion of the recess portion 39 that is on the other end side restrains the adhesive portion 5 from moving toward the other end side of the molded portion 3C. In this case, it is possible to suppress a situation in which the heat shrinkable tube 40 is shrunk excessively in the direction of extension of the heat shrinkable tube 40, as well as a situation in which the adhesive portion 5 moves toward the other end side of the molded portion 3C. Accordingly, in the molded portion-equipped electric cable 100D including the insulated conductor portion 1, it is possible to eliminate the need for an insulating cover removing step.

Application Examples

The first stepped portion 311 may be a portion of the first recess portion 391 that is on the other end side of the molded portion 3, the first recess portion 391 being inwardly recessed from the outer circumferential surface of the molded portion 3. Likewise, the second stepped portion 312 may be a portion of the projection portion 38 that is on the one end side of the molded portion 3, the projection portion 38 protruding from an inner side toward the outer circumferential surface on the outer circumferential surface of the molded portion 3.

In the embodiment and the variations, only one first stepped portion 311 is provided, but a plurality of first stepped portions 311 may be provided. Likewise, a plurality of second stepped portions 312 may be provided.

Also, in the fourth variation, the adhesive portion 5 may be provided, instead of in the single recess portion 39, in a portion of the recess portion 39 that is on the other end side of the molded portion 3C.

The molded portion-equipped electric cable according to the present invention may be configured by combining the embodiment, the variations, and the application examples given above in any way or by modifying or partially omitting the embodiment, the variations, and the application examples as appropriate within the scope of the present invention recited in the appended claims.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Conductor portion
100 Molded portion-equipped electric cable
2 Terminal
3 Molded portion
311 First stepped portion
312 Second stepped portion
391 First recess portion
4 Cover portion
40 Heat shrinkable tube
5 Adhesive portion

The invention claimed is:

1. A molded portion-equipped electric cable comprising:
a linear conductor portion;
a terminal that is connected to an end portion of the linear conductor portion;
a molded portion that covers a connecting portion between the linear conductor portion and the terminal such that the terminal protrudes from one end side of the molded portion and the linear conductor portion protrudes from an other end side of the molded portion; and
an insulating cover portion that covers over the molded portion and the linear conductor portion and is formed by shrinking a heat shrinkable tube,
wherein a first stepped portion is formed on an outer circumferential surface of the molded portion such that the first stepped portion extends along a circumferential direction of the molded portion and a portion of the first stepped portion that is on the other end side protrudes so as to be present on an outer circumferential surface side relative to a portion of the first stepped portion that is on the one end side, and
an end portion of the insulating cover portion is hooked onto the first stepped portion.

2. The molded portion-equipped electric cable according to claim 1,
wherein a recess portion is formed on the molded portion, the recess portion being formed so as to extend along the circumferential direction of the molded portion and be inwardly recessed from the outer circumferential surface of the molded portion, and
a portion of the recess portion that is on the other end side constitutes the first stepped portion.

3. The molded portion-equipped electric cable according to claim 1, further comprising:
an adhesive portion that is provided between the molded portion and the insulating cover portion and fills a gap between the insulating cover portion and the molded portion.

4. The molded portion-equipped electric cable according to claim 3, wherein a second stepped portion is formed on the molded portion, the second stepped portion being positioned on the other end side relative to the first stepped portion onto which the insulating cover portion is hooked, and the adhesive portion is provided in the second stepped portion.

5. The molded portion-equipped electric cable according to claim 1,
wherein a gap is formed between the linear conductor portion and the insulating cover portion.

6. A method for manufacturing a molded portion-equipped electric cable, the method comprising the steps of:
connecting a terminal to an end portion of a linear conductor portion;
molding a molded portion that covers a connecting portion between the linear conductor portion and the terminal such that the terminal protrudes from one end side of the molded portion and the linear conductor portion protrudes from an other end side of the molded portion, and has a first stepped portion that is formed such that the first stepped portion extends along an outer circumferential surface of the molded portion in a circumferential direction of the molded portion and a portion of the first stepped portion that is on the other end side protrudes so as to be present on an outer circumferential surface side relative to a portion of the first stepped portion that is on the one end side;
shrinking a heat shrinkable tube such that an end portion of the shrunk heat shrinkable tube is hooked onto the first stepped portion so as to form a cover portion that covers over the molded portion and the linear conductor portion; and
providing an adhesive portion that fills a gap between the cover portion and the molded portion.

* * * * *